United States Patent
Gotwals et al.

(10) Patent No.: US 11,595,710 B2
(45) Date of Patent: *Feb. 28, 2023

(54) UPSTREAM SWEEP TEST WITH SWEEP SERVER SIGNALING

(71) Applicant: VIAVI SOLUTIONS INC., San Jose, CA (US)

(72) Inventors: Michael Gotwals, Greenwood, IN (US); Daniel K. Chappell, Greenwood, IN (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/900,549

(22) Filed: Jun. 12, 2020

(65) Prior Publication Data

US 2020/0314470 A1 Oct. 1, 2020

Related U.S. Application Data

(63) Continuation of application No. 15/616,720, filed on Jun. 7, 2017, now Pat. No. 10,728,595.

(60) Provisional application No. 62/346,805, filed on Jun. 7, 2016.

(51) Int. Cl.
| | |
|---|---|
| *H04N 21/24* | (2011.01) |
| *H04N 21/61* | (2011.01) |
| *H04N 21/442* | (2011.01) |
| *H04L 12/28* | (2006.01) |

(52) U.S. Cl.
CPC ..... *H04N 21/2408* (2013.01); *H04L 12/2801* (2013.01); *H04N 21/4424* (2013.01); *H04N 21/44245* (2013.01); *H04N 21/6168* (2013.01)

(58) Field of Classification Search
CPC .................................................. H04N 21/4432
USPC ......................................................... 725/107
See application file for complete search history.

(56) References Cited

U.S. PATENT DOCUMENTS

| | | | |
|---|---|---|---|
| 9,450,686 B2 | 9/2016 | Gotwals et al. | |
| 2005/0018697 A1 | 1/2005 | Enns et al. | |
| 2009/0096665 A1 | 4/2009 | Maxson et al. | |
| 2009/0268034 A1 | 10/2009 | Nowotarski et al. | |
| 2010/0309805 A1* | 12/2010 | Jones, Jr. ................ | H04L 43/50 370/252 |
| 2013/0125194 A1 | 5/2013 | Finkelstein et al. | |
| 2015/0020128 A1* | 1/2015 | Maxson ................... | H04B 3/46 725/107 |
| 2015/0029869 A1* | 1/2015 | Wolcott ................. | H04L 43/50 370/242 |
| 2015/0295746 A1 | 10/2015 | Chapman et al. | |

* cited by examiner

*Primary Examiner* — Jivka A Rabovianski
(74) *Attorney, Agent, or Firm* — Mannava & Kang, P.C.

(57) ABSTRACT

A network test instrument is operable to conduct sweep tests with a cable modem termination system having a distributed architecture. Through signaling performed via a telemetry channel between the network test instrument and a sweep server, the network test instrument can initiate the sweep test. The sweep server communicates with the cable modem termination system to facilitate the sweep test between the network test instrument and the cable modem termination system.

20 Claims, 7 Drawing Sheets

UPSTREAM SWEEP TEST WITH SWEEP SERVER SIGNALING

PRIORITY

The present application is a Continuation of commonly assigned and co-pending U.S. patent application Ser. No. 15/616,720, filed Jun. 7, 2017, which claims priority to U.S. Provisional Patent Application Ser. No. 62/346,805 filed Jun. 7, 2016, all of which are incorporated by reference in their entireties.

BACKGROUND

Service provider networks typically deliver services, such as digital television, high-speed Internet, Voice-over-IP (VoIP), etc., to customer premises. Service provider networks, including cable networks, have, in recent years, moved beyond merely broadcasting television signals over a coaxial cable to subscribers in their homes. The networks typically carry bi-directional traffic. For example, in addition to receiving data and broadcasts, subscribers of a cable network have a modem allowing the transmission of digital signals upstream toward a headend of the network. Among many services afforded by cable modems are Internet services, voice-over-Internet-Protocol (VoIP) phone services, etc.

A typical cable network is a two-way hybrid fiber-coaxial (HFC) network that supports point-to-multipoint transmission in the downstream direction using digital signals or a mix of analog and digital signals, and multipoint-to-point transmission in the upstream direction. Downstream signals, which carry broadcast digital TV signals, Internet traffic, etc., are distributed via a fiber optic connection from a head-end to a node that converts the optical signals to electrical signals and then distributes the signals to customer premises via a tree and branch coaxial cable distribution network termed 'cable plant'. Recently, service providers are running fiber to the customer premises to improve bandwidth. At the customer premises, terminal equipment, including cable modems, supports the delivery of downstream services. Upstream signals from the customer premises propagate from the branches of the cable plant towards the headend of the network. The upstream and downstream signals are prone to impairments originating at various locations in the network. There may be numerous devices, cable segments and connectors located between the fiber optic node and the customer premises equipment where defects can occur, and defects and impairments can occur at different customer premises that can impact the signal quality of other customer premises.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
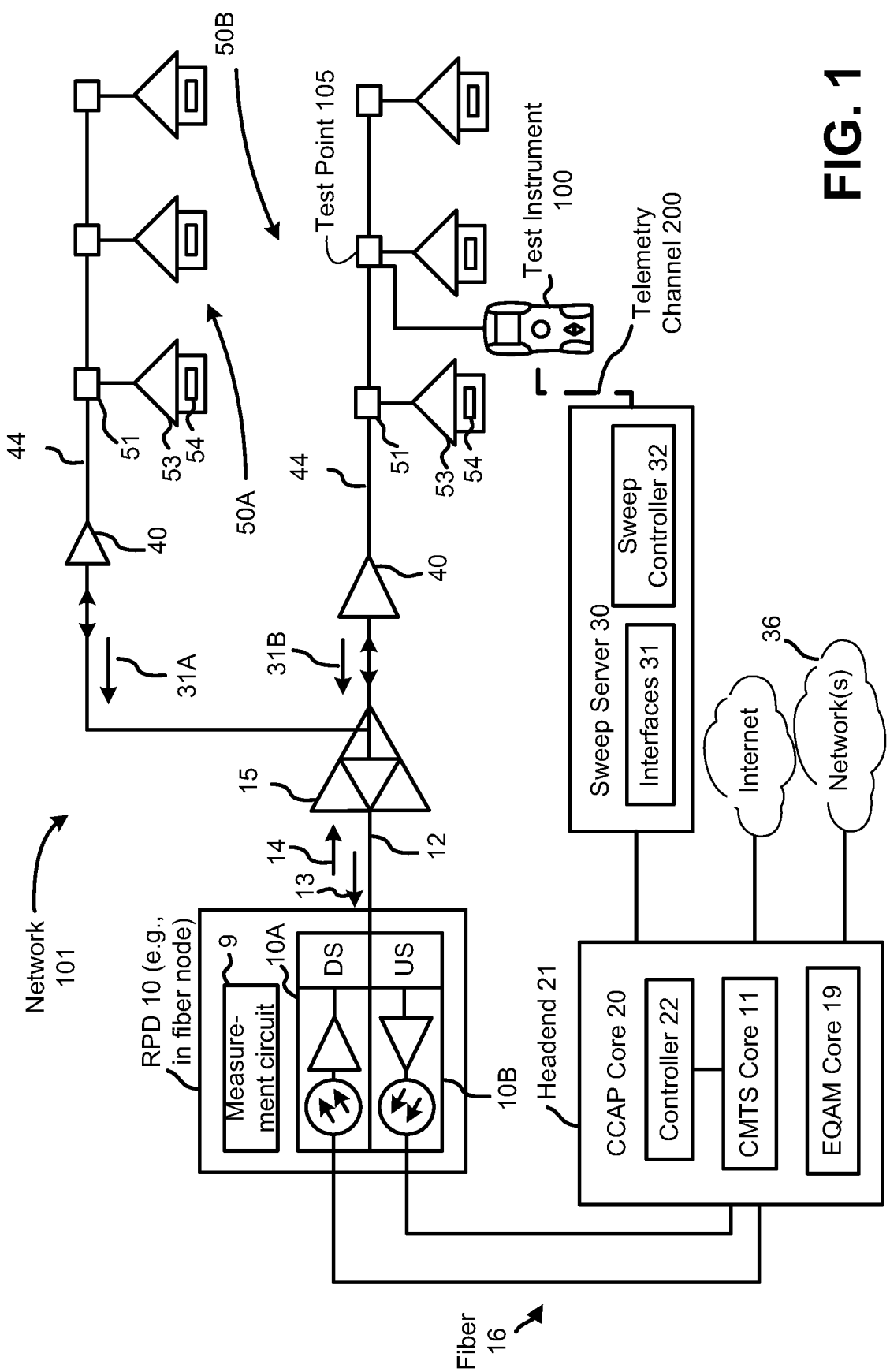
FIG. 1 illustrates a network, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

According to an example of the present disclosure, a test instrument is connectable to a network to test for signal impairments. The test point may allow the test instrument access to an upstream path in the network. The upstream path may be between a node and a headend in the network. The test instrument can insert test signals into upstream channels at the test point to test for signal impairments.

The test signals inserted into the upstream channels by the test instrument may include sweep test signals for running a frequency sweep test, referred to as a sweep test. A sweep test includes performing measurements over a range of frequencies in order to obtain frequency response information for a path in the network. For example, signal power for each signal transmitted on a different frequency is determined and may be used to diagnose faults.

According to an example of the present disclosure, the test instrument communicates with a sweep server to conduct a sweep test in the upstream path. For example, the test instrument communicates with the sweep server to initiate sweep tests, request measurements, determine upstream frequencies for inserting test signals, receive frequency response data, and perform other operations. The sweep server may communicate with a cable modem termination system (CMTS) to perform the sweep test and to obtain frequency response data measured by the CMTS for transmission to the test instrument.

The test instrument may communicate with the sweep server via a telemetry channel to receive the measured frequency response data and to detect signal impairments from the frequency response data. Also, the test instrument may execute sweep tests in a network with a CMTS having a distributed architecture including a remote physical (R-PHY) device and a CMTS core, as is further discussed below.

In a distributed architecture for the CMTS, such as described in DOCSIS 3.0 or 3.1, the physical (PHY) circuit is moved out of a device, such as out of a Converged Cable Access Platform (CCAP), and put towards the end of a network, such as closer to customer premises. For example, the classic integrated CCAP is separated into two distinct components. The first component is the CCAP core and the second component is the remote PHY device (RPD). The CCAP core for example contains both a CMTS core for DOCSIS (Data-Over-Cable Service Interface Specifications) and an edge quadrature amplitude modulation (EQAM) core for video. The CMTS core contains the DOCSIS Media Access Control (MAC) and the upper layer DOCSIS protocols. This includes signaling functions, downstream and upstream bandwidth scheduling, and DOCSIS framing. The EQAM core contains the video processing functions.

The RPD includes a physical layer converter circuit whose functions include: converting downstream DOCSIS, MPEG video and out-of-band (OOB) signals received from a CCAP-core over a digital medium, such as Ethernet or passive optical network (PON), to analog signals for transmission over radio frequency (RF) or linear optics; and converting upstream DOCSIS, and OOB signals received from an analog medium such as RF or linear optics to digital for transmission over Ethernet or Passive Optical Network (PON) to a CCAP-core.

With RPDs, RF test points in the headend are no longer available, because the RPDs that may perform the frequency measurements for sweep tests are no longer located in the headend. According to an example of the present disclosure, a test instrument may communicate with a sweep server connected to a CMTS, e.g., a CMTS core, to perform a sweep test. By executing the sweep test, an upstream sweep trace may be determined based on frequency response measurements measured by an RPD in the network that is participating in the sweep test.

As used herein, the term "packet" refers to a unit of data forwarded between an origin and a destination in a network. Each packet typically includes a payload (e.g., carrying information) and headers (e.g., carrying meta-data) that can include various layers (e.g., sub-layer headers) of meta-data. In a general sense, a "channel" refers to an information transfer path within a system (e.g., DOCSIS networks), and the mechanism by which the path is created. A channel may be a quadrature amplitude modulation (QAM) channel which refers to an analog radio frequency channel that uses QAM (e.g., a modulation technique in which an analog signal's amplitude and phase vary to convey information, such as digital data) to convey information. A QAM channel can include single carrier QAM (SC-QAM) or a legacy DOCSIS 3.0 channel. Orthogonal frequency-division multiplexing (OFDM) is used in a digital multi-carrier modulation method introduced in DOCSIS 3.1.

FIG. 1 shows an example of a network in which the test instrument may be used to perform the sweep test. The test instrument is shown as the test instrument 100. In this example, the network 101 is a cable TV network but the test instrument 100 may be used in other types of networks. Network 101 shown in FIG. 1 may be a portion of a hybrid fiber coaxial (HFC) network that delivers Cable Television (CATV) signals, including digital TV signals and data and control signals, to end users at customer premises 53 in the downstream direction, and receives and forwards data and other signals from the customer premises 53 in the upstream direction.

In an example, the network 101 includes a CMTS having a distributed architecture whereby the PHY circuit is separated from the CMTS core. The CMTS, for example, includes RPD 10 and CMTS core 11. The CMTS core 11 may be included in a CCAP core 20 as is further discussed below. The RPD 10 includes converter circuits that may be operable to convert downstream DOCSIS, MPEG video and OOB signals from RF signals and to convert upstream DOCSIS and OOB signals received from an analog medium such as RF to a digital medium for transmission towards the CMTS core 11.

In an example, the RPD 10 may be in a fiber-optic node and may include a downstream (DS) opto-electronic converter 10A that converts DS optical signals received from the CMTS core 11 into downstream electrical RF signals 14. The RPD 10 may also include an upstream (US) electro-optic converter 10B that converts US electrical RF signals 13 into US optical signals for upstream transmission towards the CMTS core 11. The fiber-optic node may be coupled via a coaxial cable 12 to a bidirectional amplifier 15, which amplifies the downstream RF signals 14 for distribution to first and second groups of customer premises 50A and 50B.

The RPD 10 may also include a frequency response measurement circuit 9. The frequency response measurement circuit 9 may measure signal parameters of upstream signals received at the RPD 10. For example, to conduct the sweep test to test the upstream channels in the network 101, the test instrument 100 inserts test signals in the upstream channels. According to an example, the test signals may be inserted in time slots not used for carrying customer traffic, or the test signals may be transmitted on narrow carriers not used for upstream traffic to avoid interference with upstream traffic from the customer premises 53.

The frequency response measurement circuit 9 measures signal parameters of the test signals transmitted by the network instrument 100 and received at the RPD 10. The measured signal parameters may include frequency response, such as an amplitude-versus-frequency response of received signals. In an example, the frequency response measurement circuit 9 takes a time varying input signal and computes its frequency spectrum, e.g., Fast Fourier Transform (FFT) data. For example, the frequency response measurement circuit 9 includes an FFT spectrum analyzer that samples the input signal (e.g., received test signal), computes the magnitude of its sine and cosine components, and from the magnitudes determines the spectrum of these measured frequency components. The FFT data is transmitted back to the test instrument 100 by sweep server 30. The test instrument 100 determines the frequency response of the upstream channels from the FFT data measured by the frequency response measurement circuit 9. The RPD 10 may also include circuitry (not shown), such as downstream QAM and OFDM modulators, upstream QAM and OFDM demodulators, and pseudowire logic needed to connect to CCAP core 20.

The downstream RF signals 14 generated by the downstream optoelectronic converter 10A are distributed to a plurality of end-of-the-line subscribers or end users, for example, via one or more trunk coaxial cables 44 and subscriber taps 51. At the customer premises 53, the DS signals are demodulated using cable modems 54 which may be connected to customer premises equipment (not shown), such as wireless routers, set top boxes, smart televisions, personal computers, smartphones, etc.

One or more two-way trunk RF amplifiers 40 may further be provided in each trunk cable 44 to suitably amplify the upstream and downstream CATV signals on their way to and from the customer premises 53. The first and second groups of customer premises 50A and 50B may send upstream signals 31A and 31B, respectively, which may be combined by the bidirectional amplifier 15 into the upstream RF signal 13 propagating towards the RPD 10. The RPD 10 may be in a fiber node delivering optical signals to the CMTS core 11, which may be located at headend 21, via a fiber line, shown as fiber 16.

The network 101 may serve a large number of customer premises, which may be connected by taps 51 to a plurality of different cable trunks 44 at a plurality of different locations. The trunk cables 44 may be buried in the ground or they may be elevated above the ground on utility poles, or a combination of both. In other examples, fiber cables may be run to the home and the test instrument 100 may connect to the fiber cables. Also, a single RPD 10 is shown, but the network 101 may include multiple RPDs, each servicing groups of customer premises. The multiple RPDs may be connected to the CMTS core 11.

A headend 21 may include CCAP core 20. The CCAP core 20 may include the CMTS core 11, EQAM core 19 and controller 22. The CCAP core 20 can control and setup data paths with multiple RPDs, including the RPD 10, which may be situated in multiple fiber nodes. The CMTS core 11 supports the DOCSIS MAC protocol and the upper layer DOCSIS protocols. This includes signaling functions, downstream and upstream bandwidth time slot scheduling, and DOCSIS framing. The EQAM core 19 provides video processing functions. The headend 21 may send and receive video and data via the Internet or other networks 36, which may include video and/or packet cable infrastructures. The controller 22 may perform the signaling between the CMTS and the sweep server 30 described with respect to FIG. 2. For example, the controller 22 performs operations, such as retrieving frequency response data from the RPD 10, providing the frequency data to the sweep server 30 and performing other operations as is further discussed with respect to FIG. 2. The controller 22 may be part of a CMTS including the CMTS core 11 and the RPD 10. The controller 22 may be a controller in the CMTS core 11 or may be connected to the CMTS core 11. The CCAP core 20 may include any suitable circuits, data storage devices, processors and interfaces to perform the operations described herein. The CCAP core 20 may include machine readable instructions stored on a non-transitory computer readable medium and executed by a processor or other control circuitry to perform one or more operations described herein.

The sweep server 30 is connected to the CMTS. For example, the sweep server 30 is connected to the CCAP core 20 and/or the controller 22 and CMTS core 11. The sweep server 30 may include one or more interfaces 33. The interfaces 33 may include network interfaces to connect to the CMTS core 11 or other components of the CCAP core 20. The interfaces 33 may include an interface to connect to telemetry channel 200, which is described below. The sweep server 30 may include sweep controller 32 to perform the operations of the sweep server 30, such as described with respect to FIG. 2. The sweep server 30 may be co-located with the CMTS core 11, such as on the same chassis or on a different chassis in the headend 21, or the sweep server 30 may be located remotely from the headend 21 and connected to the CMTS core 11 via a network. The sweep server 30 may include a processor and a non-transitory computer readable medium storing machine readable instructions executable by the processor or other suitable circuitry to perform the functions of the sweep server 30 described herein. The test instrument 100 may communicate with the sweep server 30 to request sweep measurements, determine a frequency plan comprised of set of upstream channels for sweep testing, and to get frequency response data as is further discussed with respect to FIG. 2.

The test instrument 100 may be connected to the network 101 at a desired test point to transmit test signals via the test point. For example, the test instrument 100 is shown as connected to test point 105. The test instrument 100 may be connected at any location where connections are available to connect to the network 101. The test points may include test points having access to upstream channels in the network 101, such as a location in the network 101 downstream from the RPD 10. The test instrument 100 may be connected to the network 101 via a test access point (tap).

The test instrument 100 may include one or more ports to connect to the test point 105. In an example, the port(s) include coaxial RF cable connectors. It will be appreciated that test instrument 100 may also have other non-cable ports, for example, to connect to a computer or to an external display, such as but not exclusively one or more USB ports and the like. The test instrument 100 may inject test signals into upstream channels in the network 101 to conduct sweep tests, as is discussed below. For example, the test instrument 100 may determine the frequency response of upstream channels, such as DOCSIS carriers for carrying traffic from customer premises 53, based on FFT data measured by the CMTS and received from the sweep server 30, and display the frequency response. The test instrument 100 may also determine other signal quality information, such as modulation error ratio (MER), in-band group delay, micro-reflections, impulse noise, a number of captured symbols in the upstream data packet, a number of erroneously detected symbols in the upstream data packet, a constellation map, and an RF power level, and display the signal quality information. The frequency response data determined from the sweep tests and other signal quality information displayed by the test instrument 100 may be used by a technician to test and diagnose signal impairments, such as initial and periodic alignment of the network, identifying improperly adjusted actives, missing or damaged plant components, and other problems that degrade the network's frequency response from an ideal situation.

Figure 2:
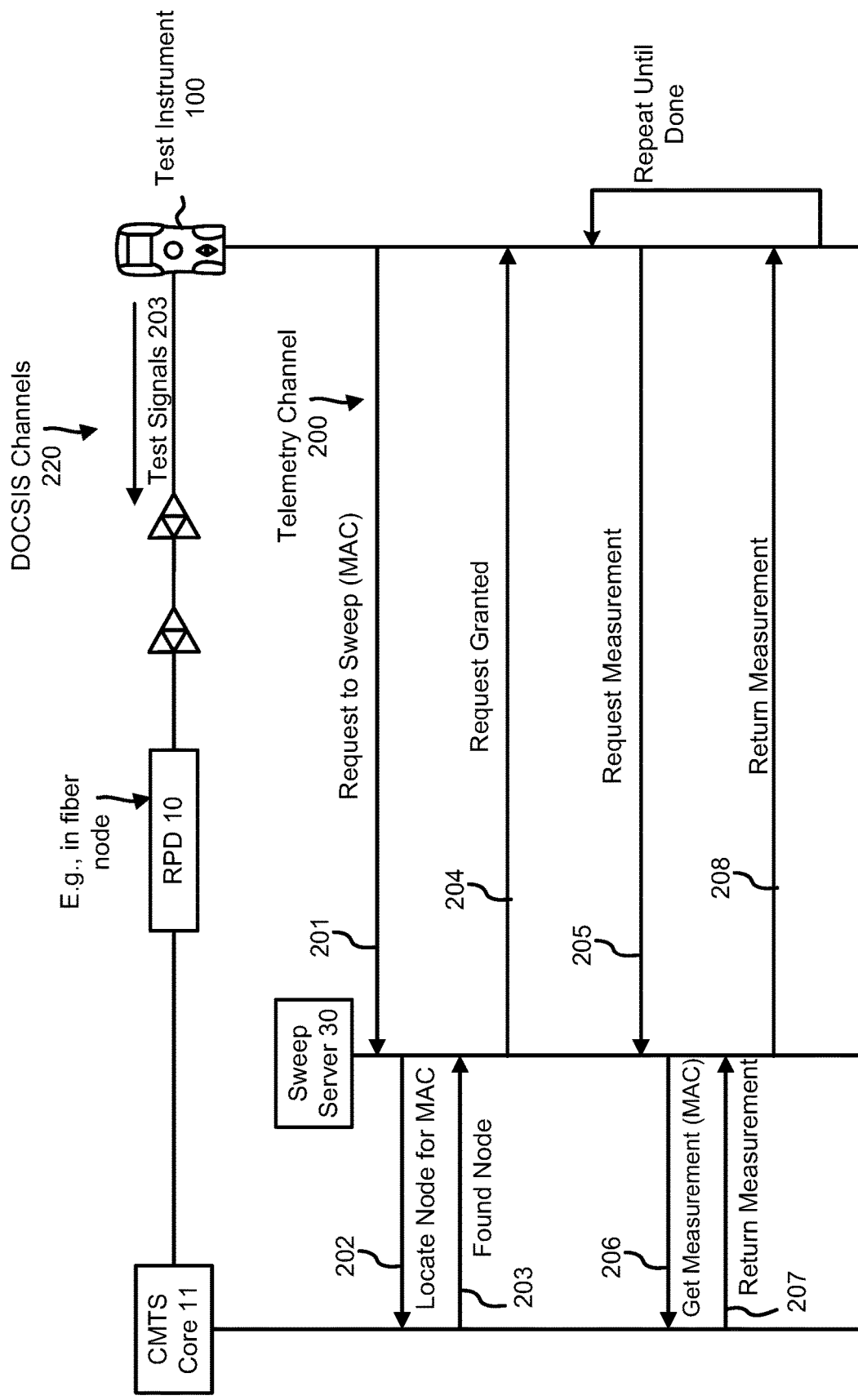
FIG. 2 illustrates a data flow between components of the network to perform a sweep a test, according to an example of the present disclosure.

FIG. 2 illustrates a data flow diagram for the test instrument 100 to conduct a sweep test in the network 101. The testing may include conducting sweep tests in upstream channels of the network 101 between a test point, such as test point 105, and an RPD, such as RPD 10. For example, the test instrument 100 is connected to the cable plant of the network 101 at test point 105 or any test point that will allow the test instrument 100 access to the upstream path to inject test signals in upstream channels for sweep tests or other tests.

The test instrument 100 may communicate with the sweep server 30 via a telemetry channel 200 to facilitate a sweep test. The message exchange between the test instrument 100 and the sweep server 30 shown in FIG. 2 is referred to as signaling or sweep server signaling and may be performed on the telemetry channel 200. For example, the telemetry channel 200 is used to send and receive messages between the sweep server 30 and the test instrument 100 to perform a sweep test. The telemetry channel 200 may be OOB from the upstream channels carrying data between the customer premises 53 and the headend 21. For example, the telemetry channel 200 may be a cellular connection. The telemetry channel 200 may include an RF channel in the R-PHY OOB Narrowband Digital Forward (NDF) and OOB Narrowband Digital Return (NDR) channels. The OOB NDF and OOB NDR channels are described in the DOCSIS specification and rely on tunneling to isolate the 00B traffic (e.g., messages between test instrument 100 and the sweep server 30) from the DOCSIS and MPEG video traffic to/from the customer premises 53. In another example, the telemetry channel 200 may include a sweep telemetry channel in a DOCSIS upstream channel. Examples of the telemetry channel 200 are further discussed below with respect to FIGS. 3A-C.

In FIG. 2, at 201, the test instrument 100 transmits a sweep request message to the sweep server 30. The sweep request message may be transmitted in response to a user selecting to perform a sweep test via a user interface of the test instrument 100 when the test instrument is connected to the test point 105. The sweep request message may request that a sweep test be performed between the test instrument 100 and the CMTS. The CMTS for example comprises the CMTS core 11 and the RPD 10. The sweep request message may include an identifier of the test instrument 100. The identifier may include a network address, such as a MAC address of the test instrument 100.

At 202, the sweep server 30 sends instructions to the CMTS that signal quality information is to be measured for test packets having the MAC address of the test instrument 100. The CMTS for example includes the CMTS core 11 and RPD, and the instructions may be sent to the CMTS core 11. In an example, the sweep request message received at the sweep server 30 includes the MAC address of the test instrument 100. At 202, the sweep server 30 sends a message to the CMTS core 11 to locate the node or RPD servicing the device with the MAC (i.e., the test instrument 100). At 203, the CMTS core 11 responds to the message with an indication that the RPD 10 is identified as the node servicing the MAC address.

At 204, the sweep server 30 receives the message from 203 and responds to the test instrument 100 with a request granted message, which indicates to the test instrument 100 that it is permitted to perform a sweep test and further indicates an upstream channel plan for conducting the sweep test. The upstream channel plan includes a list of frequencies in the upstream path, e.g., upstream channels, that the test instrument 100 can insert test signals for conducting the sweep test. The upstream channel plan may be based on the upstream channels being serviced by the RPD 10 and the CMTS core 11, and the upstream channel plan may be provided to the sweep server 30 from the CMTS core 11. The test signals 203 transmitted by the test instrument 100 for the sweep test may include test packets including a network address, such as a MAC address, of the test instrument 100. Time slots may be identified for the test instrument 100 to insert the test signals 203 in the upstream channels specified in the upstream channel plan, which may include frequencies in upstream DOCSIS carriers 220. The test instrument 100 transmits the test signals 203 upstream to the CMTS, creating traffic on upstream DOCSIS carriers 220, which may be specified in the upstream channel plan.

The RPD 10 receives the test signals 203 and measures signal quality information, including frequency response data (e.g., FFT data), for the test signals. For example, the RPD 10 demodulates the test signals 203 and parses the test packets in the test signals 203 to determine the MAC address in the test packets. The RDP 10 may determine the MAC address in the test packets matches the MAC address of the test instrument 100, and the RPD 10 measures the signal quality information for the test packets. The signal quality information includes frequency response data comprising the power level of the test signal inserted at each frequency of the upstream channel plan. The measured frequency response may be used to correct pre-equalization coefficients. Advantageously, combining QAM signal quality information with a frequency response determined based on pre-equalization coefficients provides an operator of the test instrument 100 with a broad, multi-level set of data sufficient for troubleshooting most upstream path problems. Other signal parameters that may be measured by the test instrument 100 may include modulation error ratio (MER), in-band group delay, micro-reflections, impulse noise, a number of captured symbols in the upstream data packet, a number of erroneously detected symbols in the upstream data packet, and a constellation map.

At 205, the test instrument 100 sends a request measurement message to the sweep server 30 for the FFT data measured by the RPD 10. The request measurement message may include the MAC address of the test instrument 100. At 206, the sweep server 30 sends a get spectrum request message to the CMTS core 11 to request the CMTS core 11 to provide the FFT data measured by the RPD 10 for the test signals having the MAC address of the test instrument 100. The get spectrum request message may include the MAC address of the test instrument 100. The CMTS core 11 gets the FFT data measured by the RPD 10 for particular frequencies which may be specified in the upstream channel plan, and provides the FFT data to the sweep server 30 at 207. At 208, the sweep server 30 sends the FFT data queried from the CMTS core 11 to the test instrument 100 in a return spectrum measurement message. The process may be repeated multiple times to capture FFT data for test signals injected by the test instrument 100 multiple times. The capture FFT data may be collected and combined into a single peak hold spectrum to insure all upstream carriers and sweep points are captured in an FFT and that the FFT data is stable. Using the FFT data and known transmission levels, the test instrument 100 can create a frequency response for the cable plant between the test point 105 and the RPD 10. By using equalizer (EQ) tap analysis to generate an in-band response trace, and combining this in-band response with the sweep points and carrier levels, a higher resolution sweep can be constructed. This process can be repeated until the upstream sweep is no longer needed.

The CMTS, which includes the RPD 10 and the CMTS core 11, may be in a management network that is not accessible without proper credentials. For example, service providers may utilize firewalls or other network security measures to prevent unauthorized access to the CMTS and other network equipment. In these instances, a test instrument 100 cannot communicate with the CMTS to coordinate upstream sweep tests, and thus the upstream sweep tests may not be able to be performed by the test instrument. As is shown in FIG. 2, the test instrument 100 communicates with the sweep server 30 to coordinate the upstream sweep tests, and the sweep server 30 communicates with the CMTS to facilitate the upstream sweep tests. Accordingly, the upstream sweep tests may be performed by the test instrument 100 as described in the examples herein.

Figure 3A:
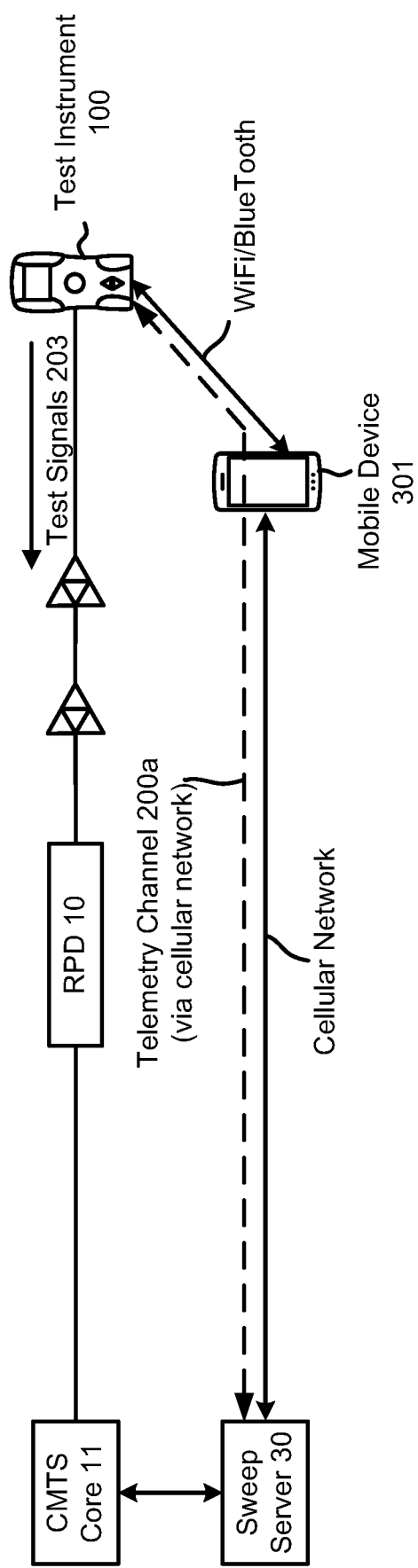
FIGS. 3A-C illustrates telemetry channels, according to examples of the present disclosure.
Figure 3B:
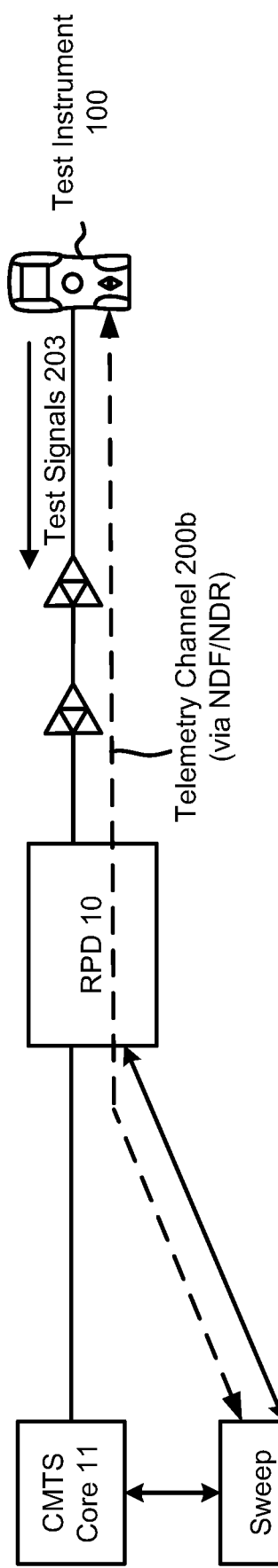
Figure 3C:
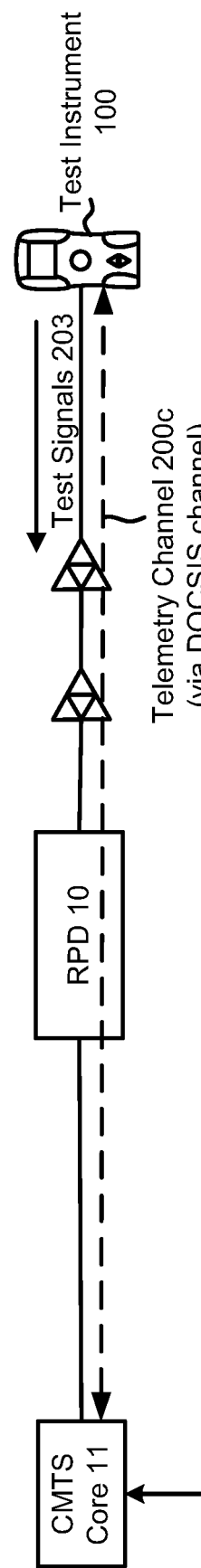

As discussed above with respect to FIG. 2, the test instrument 100 may communicate with the sweep server 30 via a telemetry channel 200 to facilitate sweep tests. The telemetry channel 200 is used to send and receive messages between the sweep server 30 and the test instrument 100. FIGS. 3A-C show examples of the telemetry channel 200.

FIG. 3A shows an example of a cellular telemetry channel 200a. For example, the test instrument 100 may connect to a mobile device 301 with a cellular network interface that provides a cellular connection to the sweep server 30. The test instrument 100 may connect to the mobile device 301 through a wireless connection, such as via Bluetooth or WiFi, or a wired connection, such as via a universal service bus (USB) cable. In another example, the test instrument 100 may have a cellular network interface, and in this example, the mobile device 301 is not used. Instead, the test instrument 100 connects to the sweep server 30 via its cellular network interface. The sweep server 30 may include a cellular network interface or may be connected to another device that has a cellular network interface to communicate with the test instrument 100 or to communicate with the mobile device 301.

FIG. 3B shows an example of an OOB NDF/NDR telemetry channel 200b. OOB NDF/NDR channels are described in the DOCSIS specification and may be used for the OOB NDF/NDR telemetry channel 200b. The OOB NDF/NDR telemetry channel 200b rely on tunneling to isolate the OOB traffic from the customer premises traffic.

FIG. 3C shows an example of telemetry channel 200c comprising a DOCSIS channel. FIGS. 3A-B show OOB telemetry channels 200a-b, and FIG. 3C shows an in-band telemetry channel 200c. For example, the messages shown in FIG. 2 that are communicated between the test instrument 100 and the sweep server 30 are sent in packets transmitted on DOCSIS channels which may also carry customer premises traffic.

Figure 4:
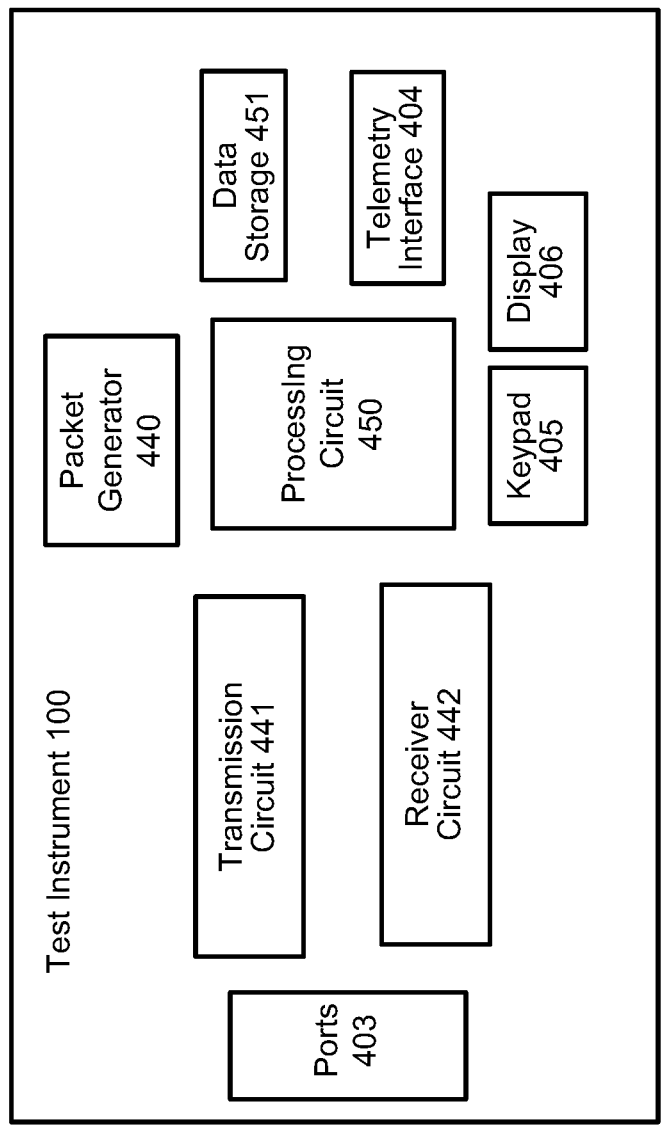
FIG. 4 illustrates a test instrument, according to an example of the present disclosure.

FIG. 4 shows the test instrument 100, according to an example. The test instrument 100 may include components other than shown. The test instrument 100 may include one or more ports 403 for connecting the test instrument 100 to a test point, such as the test point 105 shown in FIG. 1. The ports 403 may include connectors for connecting to cables in the network 101 carrying traffic, such as video, voice and data packets, for customer premises 53. The test instrument 100 may include a telemetry interface 404 for connecting to telemetry channel 200, such as a WiFi interface, Bluetooth interface, cellular interface or another network interface. The test instrument 100 includes a user interface which may include a keypad 405 and a display 406 and/or a touch screen display. A user may interact with the test instrument 100, such as to enter information, select operations, view measurements, etc., via the user interface.

The test instrument 100 also includes a processing circuit 450. The processing circuit 450 controls the sweep test process and performs data processing on the received frequency response data. The processing circuit 450 may include any suitable hardware to perform the operations of the test instrument 100 described herein, including the operations described with respect to FIG. 2 and measuring and testing operations described herein. The hardware of the test instrument 100, including the processing circuit 450, may include a hardware processor, microcontroller, a digital signal processor (DSP), an application specific integrated circuit (ASIC), a field programmable gate array (FPGA) or other programmable logic device, discrete gate or transistor logic, discrete hardware components, or any combination thereof designed to perform the functions and methods described herein. In an example, one or more of the functions and operations of the test instrument 100 described herein may be performed by the processing circuit 450 or other hardware executing machine readable instructions stored in a non-transitory computer readable medium, which may comprise RAM (random access memory), ROM (read only memory), EPROM (erasable, programmable ROM), EEPROM (electrically erasable, programmable ROM), hard drives, flash memory, or other types of storage devices, which may be volatile and/or nonvolatile.

The test instrument 100 further includes a packet generator 440 to generate test packets to be included in the tests signals 203 transmitted in the network 101 for sweep tests and other tests. The processing circuit 450 may control the packet generator 440 to generate test packets to perform a sweep test. The test instrument 100 may include a transmission circuit 441. The transmission circuit 441 may include a modulator and other known transmitter components for transmitting the test packets in test signals 203, including the test packets, in the network 101. The processing circuit 450 may control the transmission circuit 441 to transmit the test signals 203 in particular upstream channels determined from an upstream channel plan. The test signals 203 may include carriers briefly inserted at specific frequencies specified in the upstream channel plan.

The transmission circuit 441 may include a power meter to measure the power of the test signals transmitted from the test instrument 100, and the measured power may be compared to power from the frequency response data received from the CMTS via the sweep server 30 to determine the difference between the transmitted and received power of the test signals. The test instrument 100 may also include a receiver circuit 442 to receive signals from the network 101, and the processing circuit 450 may measure signal parameters of received signals to detect impairments.

A data storage 451 may store any information used by the test instrument 100 and may include memory or another type of known data storage device. The data storage 451 may store power level measurements or any other measurements determined by the test instrument 100. The stored information may be displayed on the display 406 and/or communicated to another device.

The processing circuit 450 may determine signal quality information that may be displayed on display 406. The signal quality information may include frequency response data received from the sweep server 30. The signal quality information may include a comparison between the power of the transmitted test signal versus the power of the test signal received at the RPD 10, or other parameters determined from the sweep test.

In an example, a technician wishing to test the upstream path at the test point 105 connects the test instrument 100 to the test point 105 via the ports 403. The technician may select via the keypad 405 to perform a sweep test, and the test instrument transmits the test signals 203 in the upstream path to the RPD 10. Other operations described with respect to FIG. 2 are performed. The test instrument 100 receives the frequency response data from the sweep server 30, determines the frequency response of upstream channels based on the frequency response data, and displays it on the display 406. The frequency response may include an amplitude-versus-frequency response of the test signals transmitted to the RPD 10 and/or may include a comparison of the amplitude-versus-frequency response of the transmitted test signals versus the received test signals. For example, the difference in power between the transmitted and received test signals is determined by the test instrument 100 and can be displayed on the display 406 of the test instrument 100. The technician observes the test results on the display 406. Advantageously, this provides a real-time feedback for the technician performing repairs in the field. In another example, the test instrument keeps performing tests and accumulating results at the headend, to be observed by the technician at a later time at the headend or elsewhere in the field, using a Web browser interface connected to the Internet.

In an example, the processing circuit 450 may be used to optimize pre-equalization coefficients. For example, the test instrument 100 determines the pre-equalization coefficients of the test signals transmitted by the test instrument 100. The RPD 10, after demodulation of an upstream test packet in the test signal, determines these coefficients for the received test packet and the coefficients are sent to the test instrument 100 by the sweep server 30. The pre-equalization coefficients may be modified to optimize for signal quality degradation caused by the transmission path.

Figure 5:
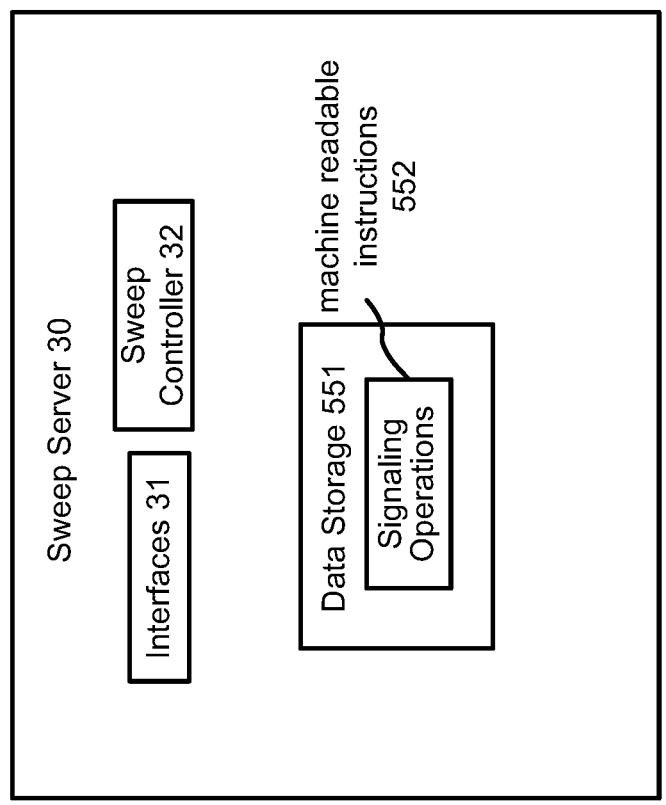
FIG. 5 illustrates a sweep server, according to an example of the present disclosure.

FIG. 5 shows a block diagram of the sweep server 30, according to an example. The sweep server 30 may include components other than shown. As discussed above, the sweep server 30 may include one or more interfaces 33. The interfaces 33 may include network interfaces to connect to the CMTS core 11 or other components of the CCAP core 20. The interfaces 33 may include an interface to connect to telemetry channel 200, such as a cellular network interface or another type of network interface for connecting to the telemetry channel 200. The sweep server 30 may include sweep controller 32 to perform the operations of the sweep server 30, such as described with respect to FIG. 2.

The sweep controller 32 may include any suitable hardware to perform its operations as described herein, including the operations described with respect to FIG. 2 and measuring and testing operations described herein. The hardware may include a hardware processor, microcontroller, a digital signal processor (DSP), an application specific integrated circuit (ASIC), a field programmable gate array (FPGA) or other programmable logic device, discrete gate or transistor logic, discrete hardware components, or any combination thereof designed to perform the functions and methods described herein.

In an example, sweep controller 32 may execute machine readable instructions 552 stored on data storage 551. The machine readable instructions 552 may include instructions to execute the signaling described in FIG. 2. The data storage 551 includes a non-transitory computer readable medium, which may comprise RAM (random access memory), ROM (read only memory), EPROM (erasable, programmable ROM), EEPROM (electrically erasable, programmable ROM), hard drives, flash memory, or other types of storage devices, which may be volatile and/or nonvolatile. The data storage 551 may store any data used by the sweep controller 32.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A test instrument, comprising:
   a processor; and
   a memory storing instructions, which when executed, causes the processor to:
   insert, via a port, test signals into an upstream path of a first network at a test point, wherein the test point is located in the first network and downstream from a remote physical (R-PHY) device connected to a cable modem termination system (CMTS) core, wherein the R-PHY device comprises at least one of a downstream modulator, an upstream demodulator, or pseudowire logic; and
   receive, via a sweep test, frequency response data of the test signals measured by the R-PHY device from a sweep server via a telemetry channel, wherein the sweep server comprises at least one network interface that communicates with the CMTS core to obtain the measured frequency response data for transmission to the test instrument, wherein the telemetry channel transmits and receives signals over a second network.

2. The test instrument of claim 1, further comprising:
   determine a frequency response for the first network between the test point and the R-PHY device based on the frequency response data, wherein the frequency response comprises Fast Fourier Transform (FFT) data.

3. The test instrument of claim 1, wherein to initiate the sweep test to receive the frequency response data, the processor is to:
   transmit a sweep request message to the sweep server;
   receive an upstream channel plan from the sweep server in response to the sweep request message; and
   insert the test signals into frequencies in the upstream path that are specified in the upstream channel plan.

4. The test instrument of claim 1, wherein the processor is to transmit a message, including a network address of the test instrument that is to be included in the test signals, to the sweep server, and the sweep server sends the network address of the test instrument to the CMTS core for determining the frequency response data.

5. The test instrument of claim 4, wherein the CMTS core instructs the R-PHY device to send the frequency response data for the test signals having the network address of the test instrument to the CMTS core, and the CMTS core transmits the frequency response data to the sweep server.

6. The test instrument of claim 1, the test instrument comprises an interface connectable to the second network or connectable to a device to access the second network.

7. The test instrument of claim 1, wherein the telemetry channel comprises an out-of-band channel comprising an R-PHY narrowband digital forward channel and a narrowband digital return channel.

8. The test instrument of claim 7, wherein the out-of-band channel comprises a channel in a cellular network.

9. The test instrument of claim 1, wherein the telemetry channel also comprises an in-band channel carrying network traffic for customer premises connected to the second network.

10. The test instrument of claim 1, wherein the frequency response data comprises at least one of an amplitude-versus-frequency response of the test signals transmitted from the test instrument, and a difference in power between the test signals transmitted from the test instrument and the test signals received at the R-PHY device for a set of frequencies in the upstream path.

11. A method, comprising:
    transmitting a sweep request message to a sweep server comprising at least one network interface that is connected to a cable modem termination system (CMTS) to request a sweep test with the CMTS;
    generating test packets for conducting the sweep test in response to receiving a request granted message from the sweep server, wherein the test packets are transmitted in test signals by a transmission circuit in an upstream path of a cable television network to the CMTS, wherein a remote physical (R-PHY) device comprises at least one of a downstream modulator, an upstream demodulator, or pseudowire logic; and
    receiving, by a sweep test from the sweep server via a telemetry channel, frequency response data of the test signals measured by the R-PHY device, wherein the telemetry channel transmits and receives signals over a second network.

12. The method of claim 11, further comprising:
    determining a frequency response for upstream channels based on the frequency response data, wherein the frequency response comprises Fast Fourier Transform (FFT) data.

13. The method of claim 11, wherein the request granted message from the sweep server includes an upstream channel plan, and the test signals are transmitted on frequencies in the upstream path that are specified in the upstream channel plan.

14. The method of claim 11, wherein the sweep request message comprises a network address of a test instrument that is to be included in the test signals, and the sweep server sends the network address of the test instrument to the CMTS for determining the frequency response data of the test signals.

15. The method of claim 14, wherein the CMTS instructs the R-PHY device to send the frequency response data for the test signals having the network address of the test instrument to the CMTS core, and the CMTS core transmits the frequency response data to the sweep server.

16. The method of claim 11, wherein the telemetry channel comprises an out-of-band channel comprising an R-PHY narrowband digital forward channel and a narrowband digital return channel.

17. The method of claim 16, wherein the out-of-band channel comprises a channel in a cellular network.

18. The method of claim 11, wherein the telemetry channel also comprises an in-band channel carrying network traffic for customer premises connected to the second network.

19. A non-transitory computer-readable storage medium having an executable instruction stored thereon, which when executed instructs a processor to perform the following:

transmitting a sweep request message to a sweep server comprising at least one network interface that is connected to a cable modem termination system (CMTS) to request the sweep test with the CMTS;

generating test packets for conducting the sweep test in response to receiving a request granted message from the sweep server, wherein the test packets are transmitted in test signals by a transmission circuit in an upstream path of a cable television network to the CMTS, wherein a remote physical (R-PHY) device comprises at least one of a downstream modulator, an upstream demodulator, or pseudowire logic;

receiving, by a sweep test from the sweep server via a telemetry channel, frequency response data of the test signals measured by the R-PHY device, wherein the telemetry channel transmits and receives signals over a second network; and determining a frequency response for upstream channels based on the frequency response data, wherein the frequency response comprises Fast Fourier Transform (FFT) data.

20. The non-transitory computer-readable storage medium of claim 19, wherein the telemetry channel comprises an out-of-band channel comprising an R-PHY narrowband digital forward channel and a narrowband digital return channel, wherein the out-of-band channel comprises a channel in a cellular network.

* * * * *